Nov. 5, 1935.  H. E. TAUTZ  2,020,222
MACHINE TABLE INSERT
Filed April 8, 1935

Inventor
*Herbert E. Tautz,*
By *Carl A. Hellmann,*
Attorney

Patented Nov. 5, 1935

2,020,222

UNITED STATES PATENT OFFICE 2,020,222

MACHINE TABLE INSERT

Herbert E. Tautz, Milwaukee, Wis., assignor to Delta Manufacturing Company, Milwaukee, Wis.

Application April 8, 1935, Serial No. 15,243

9 Claims. (Cl. 143—132)

This invention relates to inserts for machine tables.

More specifically it relates to an insert adapted to be used in the work receiving table of a machine tool, particularly a woodworking tool, to surround the revolving cutter and fill the space usually provided for changing and adjusting the said tool, so as to form a surface which is a continuation of the table top.

The present invention has for its object the provision of an insert of this kind which has means for compensating for any irregularities of alinement, whereby a definite adjustment may be made in the insert so that it will automatically always assume a definite position with its top surface in proper alinement with the top surface of the table surrounding it.

More specifically the invention has for its object the provision of adjustable means carried by the insert and acting as abutments which may be adjusted up or down as necessary to cooperate with the support for the insert in order to aline the top of the insert correctly with the table top.

Figure 1:
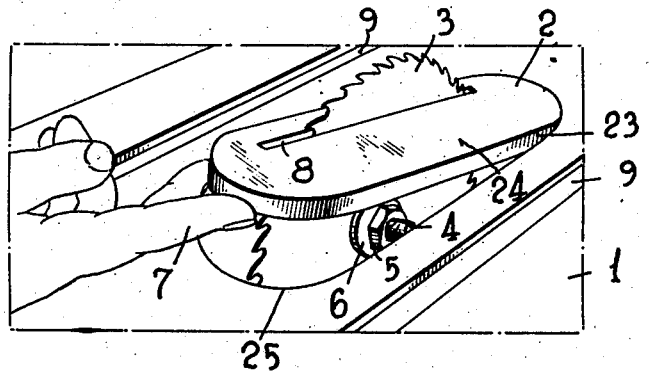
Figure 2:
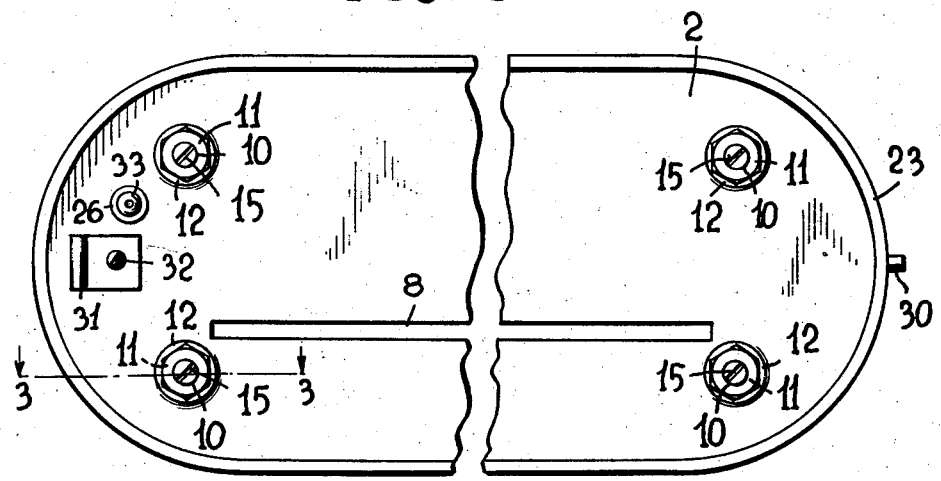
Figure 3:
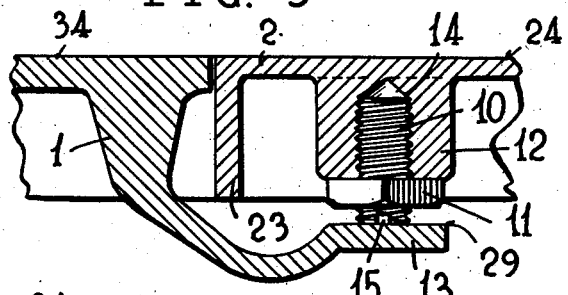
Figure 4:
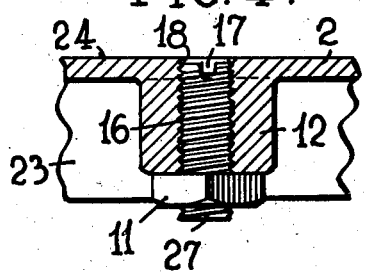
Figure 5:
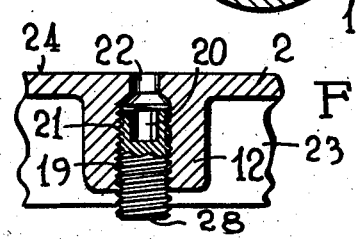

Several embodiments of the invention are described in the present specification and illustrated in the accompanying drawing wherein:

Fig. 1 is a perspective view showing a fragmentary portion of the top of a machine table with an insert being placed therein, Fig. 2 is a bottom plan view of the insert shown in Fig. 1, on a larger scale, Fig. 3 is a fragmentary vertical section of the insert, on the plane indicated by the line 3—3 of Fig. 2, but on a still larger scale, Fig. 4 is a fragmentary vertical section of a modified form of adjustable abutment which can replace that disclosed in Fig. 3, and Fig. 5 is a similar fragmentary vertical sectional view of a still further modified form of adjustable abutment. In all the figures similar reference characters are employed to designate corresponding parts.

Referring first to Fig. 1, 1 represents the top of a machine table, here employed as a part of a motor-driven circular saw, said top having an opening 25 therein of ample size to give adequate access to the saw blade 3, which is mounted on the arbor 4 by means of the nut 5 and washer 6. In order to close this opening 25 when the saw is in use, a plate or insert 2 is provided, which will fit fairly closely within said opening, said insert preferably having a substantially flat top surface 24 and a peripheral downwardly extending flange 23, the insert as shown being substantially parallel-sided but having curved, preferably semi-circular, ends. It will be understood, of course, that the shape and size of the insert do not form important features of the invention, but there are certain advantages in such form having the rounded ends.

In Fig. 1 this insert 2 is being put in place and held for this purpose by the fingers 7 of the operator. A slot 8 in the insert 2 serves to admit the saw blade 3 and allow sufficient clearance in all directions to permit satisfactory operation of the saw. 9, 9 are the customary grooves in the table top for use in guiding auxiliary appliances, such as miter gages and the like, which form no part of the present invention.

Heretofore it has been customary to support inserts of this nature by allowing them to rest upon fixed flanges or projections such as 13 (Fig. 3) formed in the lower portion of the table top 1, and such construction is in fact still employed in accordance with the present invention for supporting the inserts. However, heretofore a fixed or integral portion of the insert was allowed to rest directly upon the said flanges or projections, whereby no adjustment of the insert in a vertical direction was provided.

In accordance with the present invention, however, vertical adjustment is provided by the means illustrated in its preferred form in Figs. 2 and 3. It will be seen that the lower surface of the insert is provided with a number of projections or lugs 12, extending downwardly therefrom, and each of these lugs is provided with a screw-threaded bore, best shown at 14 in Fig. 3. Preferably the said bores 14 do not reach the surface 24 of the insert 2. Into each of these bores is inserted an abutment screw 10, provided with a lock nut 11 which bears against the lower surface of the corresponding projection or lug 12. The head of this screw, that is, that end thereof which has the slot 15, is shown in Fig. 3 as resting on and abutting against the upper surface 29 of the support 13, which is integral with or rigidly connected to the table top 1.

In Fig. 4 a slightly modified form of construction is shown wherein each lug 12 has a threaded bore 18 to receive a screw 16 having its abutment surface at its lower end 27 and a slot 17 at its upper end, a lock nut 11 being provided as in the previously described form, to secure said screw 16 against rotation with respect to the insert 2. It will be noted that screws 16 are longer than screws 10.

In the form shown in Fig. 5 each lug 12 is provided with a threaded bore 21 of proper size to receive the set screw 19 which, like screw 16, has its abutment surface 28 at its bottom. This screw, however, is of the so-called headless or "Allen" type, wherein a polygonal bore is provided in lieu of a head or slot, for manipulation by means of a wrench having an end of corresponding polygonal configuration. In the present instance a hexagonal bore 20 is shown in the set screw 19 and in order to provide access to said bore 20 for manipulating the screw an aperture of reduced size, indicated at 22, is formed in the top of the insert 2.

In operation, when the insert is first to be fitted to the particular saw table with which it is to be used, the user will adjust the four screws 10, shown in Figs. 2 and 3, by inserting a screw driver in their slots 15 and turning each screw in or out the proper amount to cause the heads of said screws to engage against the upper surface 29 of each of the abutments fixed to the table top, and diagrammatically illustrated at 13. By placing a straight-edge across the table top it will be possible to determine when the surface 24 of the insert is properly alined with the plane 34 of the table top 1, and when all four of the screws 10 have been adjusted correctly to secure such proper alinement, the lock nuts 11 may be tightened to prevent disturbance of such adjustment due to vibration, or any other cause, when in use.

In this way it is possible to manufacture the tables and inserts in large quantities without any definite attempts to secure alinement of their upper surfaces with one another and such alinement is subsequently obtained by appropriate adjustment of the four screws 10. Any inaccuracies in the lengths of the lugs 12 or in the levels of the top surfaces 29 of the fixed abutments 13 may thus readily be compensated by individual adjustment of the said screws. It will be noted also that any number of inserts may be adjusted to one table top so as to fit interchangeably therein and automatically aline properly, which is an advantage in that it permits the rapid interchange of inserts having various shapes of slots 3 therein.

It will be noticed also that inasmuch as the upper surface 24 of the insert is not pierced by the bore 14, it will not be possible for dust or chips to collect in any openings in the top of the insert and thus the workpiece cannot catch on any such projecting chips nor can any portion of the workpiece which extends or springs downwardly catch in such openings. This is an advantage over the forms shown in Figs. 4 and 5 and it is for this reason that the form illustrated in Figs. 2 and 3 may be considered the preferred type.

The Fig. 4 type is similar in principle and operation to the form just described, but has a certain advantage in one sense, in that the head of the screw 16 is directed upwardly and the threaded bore 18 is open through the top surface 24 of the insert 2 so that it may be engaged directly by placing the end of a screw driver in the slot 17, thus permitting the adjustment of the insert while in place in the table instead of requiring it to be removed for adjustment as in the Figs. 2 and 3 type. It is, of course, much simpler to adjust the insert when this can be done from above, and when the proper adjustment has been attained the lock nut 11 on each screw 16 is tightened as in the other form, in order to maintain the proper adjusted position.

The head of the screw 16 must, of course, be maintained at a level not higher than the top surface 24 of the insert, so as to avoid any interference with the workpiece. While this form has the advantage of ease and rapidity of adjustment, it has, of course, the disadvantage that it is possible for chips or projections of the workpiece to catch in the slot 17 or in the bore 18 itself, an objection which is sometimes important, particularly when thin or springy workpieces are being cut in the machine or when the pieces have projecting splinters which might spring into the hole 18 or the slot 17 and catch therein.

The Fig. 5 form has a certain advantage in this respect in that the hole 22 need not be the full size of the screw-threaded bore 21, as it need be only large enough to accommodate and permit rotation of the hexagonal end of the key or wrench which cooperates with the hexagonal bore 20 in the end of the set screw 19 to operate the same.

This form has the further advantage that instead of using a screw driver, which may slip and mar the edges of the slot 17 of the Fig. 4 form, a positive non-slip engagement is provided and, therefore, great power can be exerted in a set screw of this type by means of a suitable wrench, usually having an L-shaped or T-shaped handle, so that the screw may be made to fit very tightly in the bore 21 and for this reason will not require a lock nut.

This form has the same advantage as the Fig. 4 form, of being adjustable from above the insert, and the further advantage of needing no lock nut. There is also a slight additional advantage in that the size of the hole 22 is considerably less than that of the bore 21, or the bore 18 of Fig. 4, thus making it less likely for a workpiece to catch in said hole, particularly as no upper slotted end of a screw such as 17 of Fig. 4, and which, as already stated, may become battered and roughened by the screw driver bit, is present near the top surface 24, the "socket" or wrench-receiving end of the set screw 19 being well below the top 24 of the insert at all times.

It is obvious that suitable catches may also be provided on the insert to prevent the same from becoming loosened from the aperture in the table top unintentionally, such as springs or pins.

For example, in Fig. 2 the pin 30, which projects from the rear of the flange 23, is adapted to engage loosely in a corresponding aperture in the table top 1, while the spring 31 secured by the screw 32, shown near the front of Fig. 2, snaps against a suitable catch near the front end of the opening 25 in the table, the pin 30 and spring 31 thus holding the insert 2 against accidental derangement. A further vertical pin 33, mounted in a lug 26, may also be provided, extending downward from the lower surface of the insert 2 and engaging in a suitable guiding aperture in a portion such as 13 fixed to the table top, to further maintain the insert 2 in proper position and prevent unintentional displacement thereof. These features, however, are already known and constitute no part of the present invention.

While four lugs 12 and a corresponding number of adjusting screws have been disclosed in the present drawings, it is obvious that more or less than this number may in certain cases be found desirable and in certain cases even a single adjusting screw may be found sufficient. In order to provide for this in the claims, the term "number" is used therein in its broader mathematical sense, to mean any positive integral number, inclusive of unity, so that the term "number" when used in the claims is, therefore, equivalent to the expression "one or more", but does not necessarily mean "a plurality".

Having described my invention and disclosed several embodiments thereof, it will be understood that the inventive ideas may be embodied in still further modifications besides those disclosed herein and, therefore, for an understanding of the invention reference is to be had to the following claims.

I claim:

1. An insert for an apertured machine table and the like, having a surface intended to be alined with the surface of the table, said insert fitting into the aperture in said table, said table having supporting means and said insert carrying a number of adjustable supports cooperating with the supporting means, whereby the distance between the supporting means on the table and the upper surface of the insert may be varied by adjusting at least one support carried by the insert.

2. An insert for an apertured machine table and the like, having a surface intended to be alined with the surface of the table, said insert fitting into the aperture in said table, said table having supporting means and said insert having a number of supports screw-threaded thereinto and cooperating with the supporting means, whereby the distance between the supporting means on the table and the upper surface of the insert may be varied by turning at least one support carried by the insert.

3. An insert for an apertured machine table and the like, having a surface intended to be alined with the surface of the table, said insert fitting into the aperture in said table, said table having supporting means and said insert having a number of lugs extending from its lower surface and having a number of supports screw-threaded into said lugs and cooperating with the supporting means, whereby the distance between the supporting means on the table and the upper surface of the insert may be varied by turning at least one support carried by the insert.

4. An insert for an apertured machine table and the like, having a surface intended to be alined with the surface of the table, said insert fitting into the aperture in said table, said table having supporting means and said insert having a number of lugs, extending from its lower surface and having threaded bores therein, which do not pierce the upper surface of the insert and a number of supports screw-threaded into said bores and cooperating with the supporting means, whereby the distance between the supporting means on the table and the upper surface of the insert may be varied by turning at least one support carried by the insert.

5. An insert for an apertured machine table and the like, having a surface intended to be alined with the surface of the table, said insert fitting into the aperture in said table, said table having supporting means and said insert having a number of lugs, extending from its lower surface and having threaded bores therein, which do not pierce the upper surface of the insert, a number of supports screw-threaded into said bores and cooperating with the supporting means, whereby the distance between the supporting means on the table and the upper surface of the insert may be varied by turning at least one support carried by the insert, and locking means for retaining said support in its adjusted position.

6. An insert for an apertured machine table and the like, having a surface intended to be alined with the surface of the table, said insert fitting into the aperture in said table, said table having supporting means and said insert having a number of lugs, extending from its lower surface and having threaded bores therein, which pierce the upper surface of the insert, and a number of supports screw-threaded into said bores, each support having an operating-tool-receiving head at its upper end, said supports cooperating with the supporting means, whereby the distance between the supporting means on the table and the upper surface of the insert may be varied by turning at least one support carried by the insert, by means of its head, without removing the insert from the aperture.

7. An insert for an apertured machine table and the like, having a surface intended to be alined with the surface of the table, said insert fitting into the aperture in said table, said table having supporting means and said insert having a number of lugs, extending from its lower surface and having threaded bores therein, which pierce the upper surface of the insert, a number of supports screw-threaded into said bores, each support having an operating-tool-receiving head at its upper end, said supports cooperating with the supporting means, whereby the distance between the supporting means on the table and the upper surface of the insert may be varied by turning at least one support carried by the insert, by means of its head, without removing the insert from the aperture and locking means for retaining said support in its adjusted position.

8. An insert for an apertured machine table and the like, having a surface intended to be alined with the surface of the table, said insert fitting into the aperture in said table, said table having supporting means and said insert having a number of lugs, extending from its lower surface and having threaded bores therein, which pierce the upper surface of the insert but are of reduced diameter at said surface, and a number of supports screw-threaded into said bores, each support having an operating-tool-receiving head at its upper end, said supports cooperating with the supporting means, whereby the distance between the supporting means on the table and the upper surface of the insert may be varied by turning at least one support carried by the insert, by means of its head without removing the insert from the aperture.

9. An insert for an apertured machine table and the like, having a surface intended to be alined with the surface of the table, said insert fitting into the aperture in said table, said table having supporting means and said insert having a number of lugs, extending from its lower surface and having threaded bores therein, which pierce the upper surface of the insert but are of reduced diameter at said surface, and a number of supports screw-threaded into said bores, each support having an operating-tool-receiving head at its upper end, said supports cooperating with the supporting means, whereby the distance between the supporting means on the table and the upper surface of the insert may be varied by turning at least one support carried by the insert, by means of its head without removing the insert from the aperture said screw threads fitting with sufficient tightness to retain said support in its adjusted position.

HERBERT E. TAUTZ.